US008624959B1

(12) United States Patent
Houck, II et al.

(10) Patent No.: US 8,624,959 B1
(45) Date of Patent: Jan. 7, 2014

(54) STEREO VIDEO MOVIES

(75) Inventors: Dewey Rush Houck, II, Lorton, VA (US); Andrew T. Perlik, III, Nokesville, VA (US); Brian Joseph Griglak, Manassas, VA (US); William A. Cooney, Fairfax, VA (US); Michael Gordon Jackson, Reston, VA (US)

(73) Assignee: The Boeing Company, Chicago, IL (US)

( * ) Notice: Subject to any disclaimer, the term of this patent is extended or adjusted under 35 U.S.C. 154(b) by 700 days.

(21) Appl. No.: 12/558,467

(22) Filed: Sep. 11, 2009

(51) Int. Cl.
*H04N 13/00* (2006.01)

(52) U.S. Cl.
USPC ............................................. 348/42; 348/156

(58) Field of Classification Search
USPC ............. 348/42, 49, 51, 144, 25, 40, 43, 156, 348/419, 427, 646; 382/154
See application file for complete search history.

(56) References Cited

U.S. PATENT DOCUMENTS

| | | | | |
|---|---|---|---|---|
| 5,612,735 | A * | 3/1997 | Haskell et al. .................. 348/43 |
| 6,215,516 | B1 * | 4/2001 | Ma et al. ......................... 348/43 |
| 7,180,536 | B2 * | 2/2007 | Wolowelsky et al. .......... 348/42 |
| 8,063,930 | B2 * | 11/2011 | Rotem et al. .................... 348/42 |
| 8,330,802 | B2 * | 12/2012 | Koppal et al. ................... 348/46 |
| 8,384,762 | B2 * | 2/2013 | Markham et al. ............... 348/42 |
| 8,384,763 | B2 * | 2/2013 | Tam et al. ........................ 348/43 |
| 8,488,868 | B2 * | 7/2013 | Tam et al. ...................... 382/154 |
| 8,508,580 | B2 * | 8/2013 | Mcnamer et al. ............... 348/43 |
| 8,514,225 | B2 * | 8/2013 | Genova .......................... 345/422 |
| 2002/0191841 | A1 * | 12/2002 | Harman ......................... 382/154 |
| 2003/0080923 | A1 * | 5/2003 | Suyama et al. .................... 345/6 |
| 2004/0032980 | A1 * | 2/2004 | Harman ......................... 382/154 |
| 2004/0101043 | A1 * | 5/2004 | Flack et al. ............... 375/240.01 |
| 2004/0212612 | A1 * | 10/2004 | Epstein et al. ................. 345/419 |
| 2004/0240056 | A1 * | 12/2004 | Tomisawa et al. ............ 359/462 |
| 2007/0024614 | A1 * | 2/2007 | Tam et al. ..................... 345/419 |
| 2007/0291233 | A1 * | 12/2007 | Culbertson et al. ............. 353/34 |
| 2008/0253685 | A1 * | 10/2008 | Kuranov et al. .............. 382/284 |
| 2008/0303813 | A1 * | 12/2008 | Joung et al. ................... 345/419 |

(Continued)

FOREIGN PATENT DOCUMENTS

| | | |
|---|---|---|
| EP | 0307283 A1 | 3/1989 |
| GB | 2180719 A | 4/1987 |
| WO | W003032649 A1 | 4/2003 |
| WO | WO2010032058 A1 | 3/2010 |

OTHER PUBLICATIONS

Gruen, "Adaptive Least Squares Correlation: a Powerful Image Matching Technique", SAfr J of Photogrammetry, Remote Sensing and Cartography 14 (3), 1985, pp. 175-187.

(Continued)

*Primary Examiner* — Lashonda Jacobs
(74) *Attorney, Agent, or Firm* — Yee & Associates, P.C.

(57) ABSTRACT

A method and apparatus for processing a video data stream. The video data stream is received from a video camera system. The video data stream comprises a plurality of images of a scene. A plurality of image pairs is selected from the plurality of images. A first image of a first area in the scene overlaps a second image of a second area in the scene in each image pair in the plurality of image pairs. Each image pair in the plurality of image pairs is adjusted to form a plurality of adjusted image pairs. The plurality of adjusted image pairs is configured to provide a perception of depth for the scene when the plurality of adjusted image pairs is presented as a video.

19 Claims, 10 Drawing Sheets

(56) References Cited

U.S. PATENT DOCUMENTS

| | | | |
|---|---|---|---|
| 2009/0010323 A1* | 1/2009 | Su et al. | 375/240.01 |
| 2009/0322857 A1* | 12/2009 | Jacobs et al. | 348/42 |
| 2010/0074594 A1* | 3/2010 | Nakamura et al. | 386/92 |
| 2010/0309990 A1* | 12/2010 | Schoenblum | 375/240.29 |
| 2011/0239252 A1* | 9/2011 | Kazama et al. | 725/41 |
| 2011/0255775 A1 | 10/2011 | McNamer et al. | |
| 2012/0050490 A1* | 3/2012 | Chen et al. | 348/47 |
| 2013/0009952 A1* | 1/2013 | Tam et al. | 345/419 |

OTHER PUBLICATIONS

McAllister, "Display Technology: Stereo & 3D Display Technologies", pp. 1-50, retrieved Sep. 23, 2009 http://research.csc.ncsu.edu/stereographics/wiley_pdf.

Nielsen, "Least Squares Adjustment: Linear and Nonlinear Weighted Regression Analysis", Feb. 21, 207, pp. 1-47 http://www2.imm.dtu.dk/pubdb/views/edoc_download.php/2804/pdf/imm2804.pdf.

Moffitt et al., "Photogrammetry—Third Edition", 1980, Harper & Row, Inc., pp. 146-147, 358-360, 618-631.

Usery, "Autostereoscopy—Three-Dimensional Visualization Solution or Myth?", pp. 1-5, retrieved Sep. 23, 2009 http://www.ucgis.org/visualization/whitepapers/usery-autostereoscopy.pdf.

Runnels et al., "Real-Time 3-D Visualization of Various Geo-Referenced Digital Data on Multiple Platforms", University of S. Mississippi Center of Higher Learning High Performance Visualization Center, Oct. 2003, Report CHL-HPVC-03-02, pp. 1-6.

PCT search report dated Jul. 26, 2012 regarding application PCT/US2011/058143, filed Oct. 27, 2011, applicant reference 09-0436-PCT, applicant The Boeing Company, 12 pages.

* cited by examiner

STEREO VIDEO MOVIES

BACKGROUND INFORMATION

1. Field:

The present disclosure relates generally to processing information and, in particular, to a method and apparatus for processing a video data stream. Still more particularly, the present disclosure relates to a method and apparatus for generating a stereoscopic video data stream from a monoscopic video data stream.

2. Background:

The gathering of information about a scene may be useful and/or necessary when performing different types of missions. These types of missions include, for example, topographical mapping, intelligence gathering, surveillance and reconnaissance, target acquisition, and/or other suitable types of missions. Information is also gathered about objects at a scene. These objects include, for example, vehicles, structures, people, land masses, water bodies, ravines, hills, mountains, and/or other suitable objects at the scene.

One manner in which information about a scene is gathered is through taking images and/or video of the scene. A video is a sequence of a plurality of images in a video data stream that is presented in a manner that provides a viewer a capability to perceive motion of objects in the scene and/or the viewpoint of the viewer. As one example, data for the video is taken from a platform above the scene. The platform may be in the form of an aircraft, a satellite, a helicopter, an unmanned aerial vehicle (UAV), or some other suitable platform.

Some currently available systems for taking video of a scene include video camera systems that generate monoscopic video. Monoscopic video is video that allows a viewer to perceive a scene in two-dimensions. The video camera systems that generate monoscopic video may take the form of monoscopic video cameras. These monoscopic video cameras generate video data streams. These video data streams are monoscopic video data streams.

Other currently available systems include video camera systems that generate stereoscopic video. Stereoscopic video is a video that allows a viewer to perceive a scene in three-dimensions. The video camera systems that generate stereoscopic video may take the form of stereoscopic video camera systems. These stereoscopic video camera systems generate video data streams. These video data streams are stereoscopic video data streams. Stereoscopic is also referred to as stereo.

One currently available stereoscopic video camera system uses a pair of monoscopic video cameras. The monoscopic video cameras are positioned within a selected distance from each other. Further, the monoscopic video cameras generate video data streams from two different perspectives of the same scene. The video data streams from this pair of monoscopic video cameras are used to form stereoscopic video data streams.

A stereoscopic video data stream provides a viewer with more information about a scene as compared to a monoscopic video data stream. For example, a stereoscopic video data stream may provide a viewer with more information about objects at a scene as compared to a monoscopic video stream. More specifically, a stereoscopic video data stream may provide a viewer with a perception of depth for the scene.

This type of information may be desirable to a viewer. In this type of situation, a stereoscopic video camera system may be used instead of a monoscopic video camera. If a platform already has a monoscopic video camera, a replacement or modification of the monoscopic video camera may be performed to generate a stereoscopic video stream.

Replacing an existing monoscopic video camera with a stereoscopic video camera system requires maintenance, time, and/or expense. Further, attaching a currently available stereoscopic video camera system to a platform may add weight to the platform. The additional weight may reduce performance of the platform and/or the distance that the platform can travel.

Therefore, it would be advantageous to have a method and apparatus that takes into account at least some of the issues discussed above, and possibly other issues.

SUMMARY

In one illustrative embodiment, a method is present for processing a video data stream. The video data stream is received from a video camera system. The video data stream comprises a plurality of images of a scene. A plurality of image pairs is selected from the plurality of images. A first image of a first area in the scene overlaps a second image of a second area in the scene in each image pair in the plurality of image pairs. Each image pair in the plurality of image pairs is adjusted to form a plurality of adjusted image pairs. The plurality of adjusted image pairs is configured to provide a perception of depth for the scene when the plurality of adjusted image pairs is presented as a video.

In another illustrative example, an apparatus comprises a processor unit and a display system. The processor unit is configured to receive a monoscopic video data stream from a video camera system. The monoscopic video data stream comprises a plurality of images for a scene. The processor unit processes the monoscopic video data stream to form a stereoscopic video data stream that provides a perception of depth for the scene. The display system is configured to display a video using the stereoscopic video data stream of the scene generated by the processor unit.

In yet another illustrative embodiment, a computer program product comprises a computer readable medium and program instructions, stored on the computer readable medium. Program instructions are present for receiving a video data stream from a video camera system. The video data stream comprises a plurality of images of a scene. Program instructions are present for selecting a plurality of image pairs from the plurality of images. A first image of a first area in the scene overlaps a second image of a second area in the scene in each image pair in the plurality of image pairs. Program instructions are also present for adjusting each image pair in the plurality of image pairs to form a plurality of adjusted image pairs. The plurality of adjusted image pairs is configured to provide a perception of depth for the scene when presented as a video.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
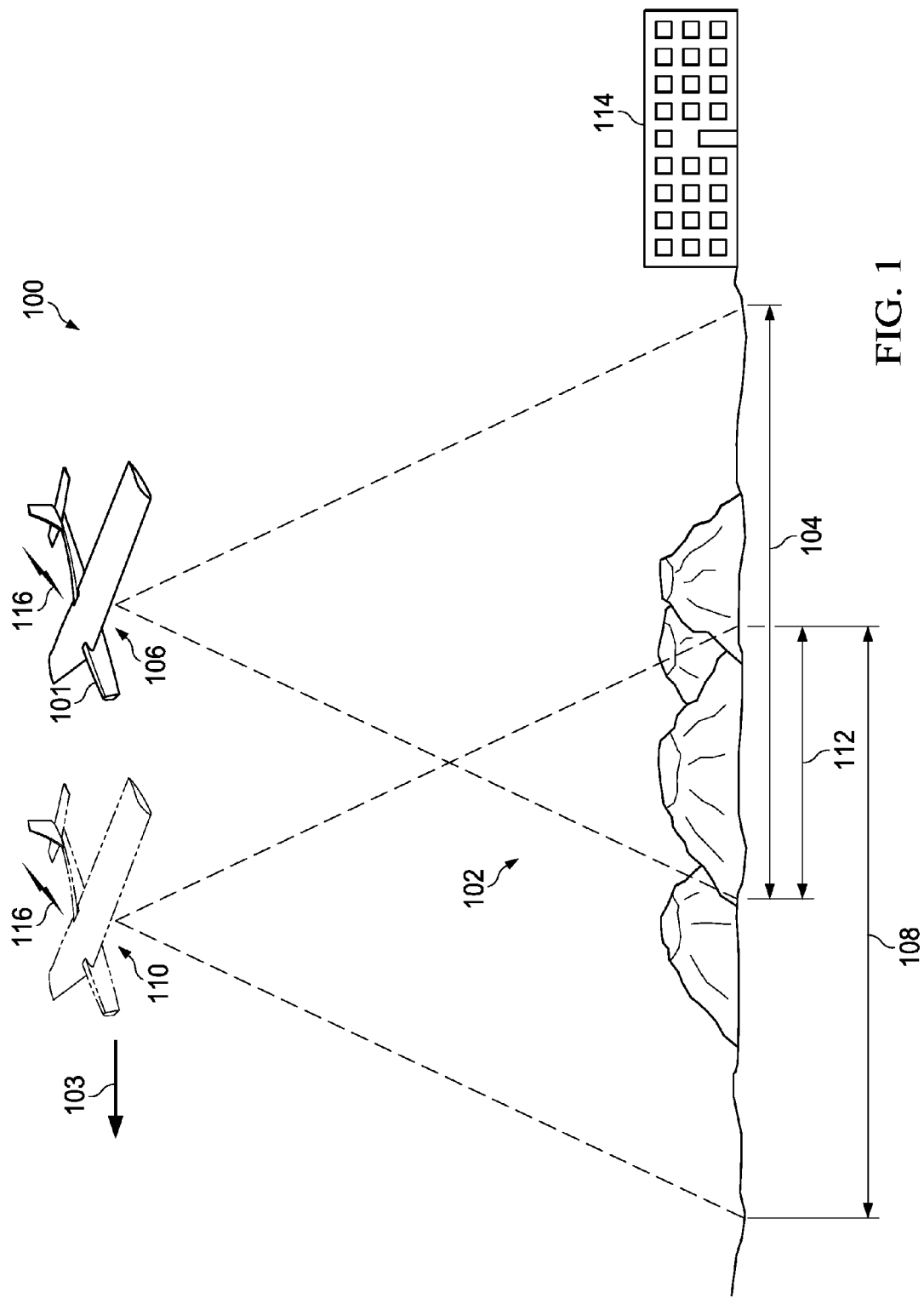
FIG. 1 is a pictorial illustration of a video imaging environment in accordance with an illustrative embodiment.

The different illustrative embodiments recognize and take into account a number of different considerations. For example, the different illustrative embodiments recognize and take into account that currently available stereoscopic video camera systems may generate images using a pair of monoscopic video cameras. Each image is also referred to as a frame. The images taken from the pair of monoscopic video cameras are processed to generate stereoscopic images. These stereoscopic images may be viewed as a video.

The different illustrative embodiments recognize and take into account that the frame rate of the stereoscopic images is limited by the frame rate of the monoscopic video cameras. In some cases, the frame rate of the monoscopic video cameras may not be as fast as desired. The frame rate is the frequency at which images are produced.

Further, images generated by monoscopic video cameras with faster frame rates may need additional processing as compared to images generated by monoscopic video cameras with slower frame rates. This additional processing may increase the amount of time needed to view the video as the video data stream is received. The different illustrative embodiments recognize and take into account that additional processing resources may be used to perform the additional processing, while reducing and/or not increasing the amount of time needed to view the video as the video data stream is received.

The different illustrative embodiments also recognize and take into account that using a single monoscopic video camera may generate a video data stream that requires less processing as compared to the video data streams generated by a pair of monoscopic video cameras. As a result, the stereoscopic video data stream processed may provide frame rates equal to or greater than the frame rate of the single monoscopic video camera.

Further, the different illustrative embodiments recognize and take into account that stereoscopic video camera systems may be capable of providing a user with a greater amount of information in a shorter time period as compared to monoscopic video cameras.

Additionally, the different illustrative embodiments also recognize and take into account that currently available systems for processing video data streams may include a greater number of hardware and/or software components than desired. The different illustrative embodiments recognize and take into account that a processing system that interpolates a video data stream may include a fewer number of hardware and/or software components as compared to currently available systems.

Thus, the different illustrative embodiments provide a method and apparatus for processing a video data stream. The video data stream is received from a video camera system. The video data stream comprises a plurality of images of a scene. A plurality of image pairs is selected from the plurality of images. A first image of a first area in the scene overlaps a second image of a second area in the scene in each image pair in the plurality of image pairs. Each image pair is adjusted in the plurality of image pairs to form a plurality of adjusted image pairs. The plurality of adjusted image pairs is configured to provide a perception of depth for the scene when presented as a video to a viewer. The viewer may be, for example, an intelligence agent, a map maker, a land planning engineer, or some other type of person.

With reference now to FIG. 1, a pictorial illustration of a video imaging environment is depicted in accordance with an illustrative embodiment. In this example, video imaging environment 100 includes aircraft 101.

As depicted, aircraft 101 generates a video data stream for scene 102 while in flight over scene 102 in the direction of arrow 103. In these examples, scene 102 is a scene that may be viewed by a viewer of the video data stream. A scene may be an actual geographic location. For example, a scene may be a city, a street, a field, a mountain, or some other suitable geographic location.

Aircraft 101 includes a video camera system that generates the video data stream. The video data stream is a monoscopic video data stream in this example. In this illustrative example, the video data stream includes images of scene 102. In other words, the video data stream includes monoscopic images that provide information about scene 102 in two dimensions. These images are taken at a frequency of about 30 Hertz or about 30 images per second in this example. In other examples, images may be taken at a frequency of, for example, about 24 Hertz or about 40 Hertz.

In the generation of images for the video data stream, aircraft 101 generates an image of area 104 in scene 102, while aircraft 101 is at position 106 over scene 102. Aircraft 101 then moves in the direction of arrow 103 to position 110. At position 110, aircraft 101 generates an image of area 108 in scene 102.

In this illustrative example, area 104 and area 108 overlap each other in overlapped area 112 in scene 102. As a result, the image of area 104 and the image of area 108 also overlap each other. In other words, overlapped area 112 is seen in both the image of area 104 and the image of area 108.

In this illustrative example, the video data stream is sent to remote location 114 for processing. Remote location 114 is a location remote to aircraft 101, such as a ground station. In other illustrative examples, the video data stream may be processed in aircraft 101. The video data stream is processed at remote location 114 to generate a stereoscopic video data stream for scene 102.

As depicted in this example, aircraft 101 sends the video data stream to remote location 114 using wireless signals 116.

In particular, wireless signals 116 may be sent over a communications link such as, for example, a wireless communications link. In other illustrative examples, aircraft 101 may send the video data stream to remote location 114 using some other suitable type of communications link.

Figure 2:
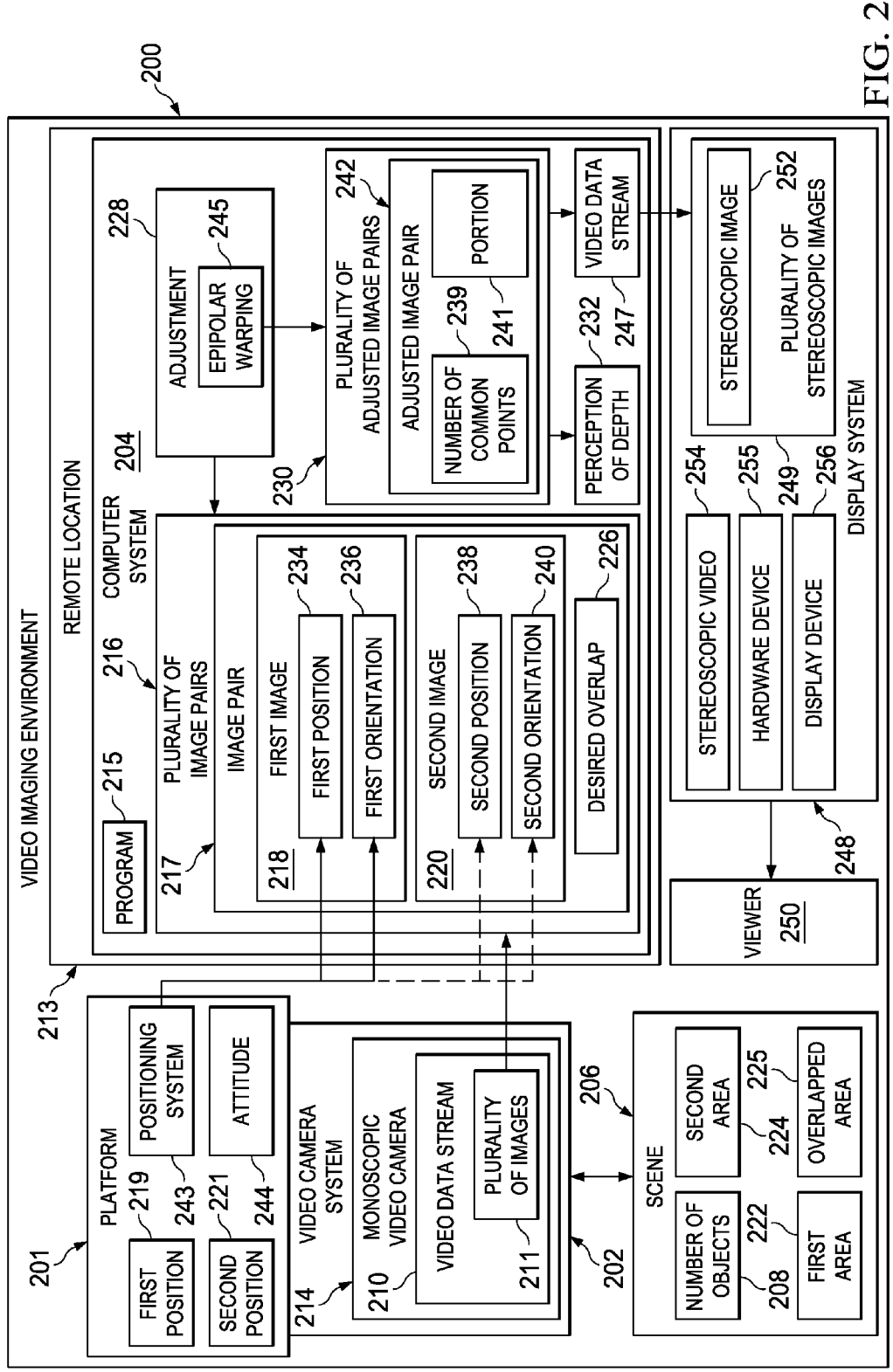
FIG. 2 is an illustration of a video imaging environment in accordance with an illustrative embodiment.

With reference now to FIG. 2, an illustration of a video imaging environment is depicted in accordance with an illustrative embodiment. Video imaging environment 200 depicts components that may be used in the pictorial illustration of video imaging environment 100 in FIG. 1.

In this illustrative example, video imaging environment 200 includes platform 201. In these illustrative examples, platform 201 is selected from one of a mobile platform, a stationary platform, an aircraft, an unmanned aerial vehicle (UAV), a helicopter, a satellite, or some other suitable platform.

Video camera system 202 is associated with platform 201. A first component may be considered to be associated with a second component by being secured to the second component, bonded to the second component, fastened to the second component, and/or connected to the second component in some other suitable manner. The first component also may be connected to the second component through the use of a third component. The first component also may be considered to be associated with the second component by being formed as part of and/or as an extension of the second component.

In this illustrative example, video camera system 202 is configured to generate video data stream 210 for scene 206. Scene 206 is a geographic location, in this example, and includes number of objects 208 at scene 206. Number of objects 208 may include, for example, without limitation, land masses, mountains, ravines, water bodies, structures, vehicles, animals, trees, people, and/or other suitable objects at scene 206. A number, when referring to items, means one or more items.

Video data stream 210 includes information about scene 206. This information may include information about number of objects 208 at scene 206. In this illustrative example, video data stream 210 comprises plurality of images 211 of scene 206. Plurality of images 211 in video data stream 210 is generated while platform 201 moves video camera system 202 over scene 206. In this example, video data stream 210 is a monoscopic video data stream, and plurality of images 211 is a plurality of monoscopic images. These monoscopic images provide information about scene 206 in two dimensions.

In this illustrative example, video camera system 202 takes the form of monoscopic video camera 214. In this particular example, monoscopic video camera 214 may be attached to the bottom of platform 201 to generate plurality of images 211 as platform 201 moves over scene 206.

Further, monoscopic video camera 214 is stationary on platform 201 in these illustrative examples. In other words, monoscopic video camera 214 does not move or rotate with respect to platform 201. Adjustments may be made to video data stream 210 to account for movement of platform 201. In other illustrative embodiments, monoscopic video camera 214 may be rotated to adjust monoscopic video camera 214 as platform 201 moves.

In these illustrative examples, video camera system 202 sends video data stream 210 to computer system 204 as video data stream 210 is generated. In this illustrative example, computer system 204 may be one or more computers. Computer system 204 is configured to execute program 215. Program 215 is executed to process video data stream 210 for viewing. In other examples, computer system 204 may be a hardware device configured to process video data stream 210 for viewing. Computer system 204 processes video data stream 210 at a rate fast enough to be substantially real-time or near real-time.

As depicted, computer system 204 is located at remote location 213. Remote location 213 is a location remote to platform 201. For example, remote location 213 may be a ground station, a truck, a building, a house, an aircraft, a satellite station, or some other suitable location remote to platform 201. In other illustrative embodiments, computer system 204 may be associated with platform 201.

In these illustrative examples, computer system 204 selects plurality of image pairs 216 from plurality of images 211 in video data stream 210 based on an overlap between images in plurality of images 211.

As one illustrative example, computer system 204 selects image pair 217 from images in plurality of images 211. In this depicted example, image pair 217 includes first image 218 and second image 220. First image 218 is generated while platform 201 is at first position 219 above scene 206. Second image 220 is generated while platform 201 is at second position 221 above scene 206.

First image 218 is an image of first area 222 in scene 206, and second image 220 is an image of second area 224 in scene 206. In this illustrative example, first area 222 and second area 224 overlap each other in overlapped area 225. As a result, at least a portion of first image 218 overlaps with second image 220. Overlapped area 225 is seen in both first image 218 and second image 220.

Image pair 217 is selected such that first image 218 and second image 220 overlap with desired overlap 226. In these illustrative examples, desired overlap 226 may be selected such that the overlap between first image 218 and second image 220 provides an amount of image separation between first image 218 and second image 220. This amount of image separation is selected to take into account a separation of the eyes of a viewer when image pair 217 is used to generate a stereoscopic video data stream. In these examples, desired overlap 226 may be, for example, about 60 percent.

As depicted, adjustment 228 is made to plurality of image pairs 216 to form plurality of adjusted image pairs 230. Plurality of adjusted image pairs 230 is configured to provide perception of depth 232 for scene 206. In these examples, perception of depth 232 for scene 206 is for overlapped area 225 in scene 206.

Perception of depth 232 is a perception of three dimensions for scene 206. These dimensions are typically referred to as length, width, and height. Perception of depth 232 also includes a perception of the relationship of number of objects 208 at scene 206 relative to each other. In other words, perception of depth 232 may be a perception of the positions of number of objects 208 relative to each other. Perception of depth 232 also may include a perception of differences in height between number of objects 208.

In these illustrative examples, one portion of adjustment 228 involves adjusting a first image and a second image in each image pair in plurality of image pairs 216 relative to each other to form plurality of adjusted image pairs 230. One or both images in each image pair may be adjusted. For example, first image 218 and second image 220 in image pair 217 are adjusted relative to each other to form adjusted image pair 242. In these illustrative examples, this adjustment may involve using, for example, without limitation, a least squares algorithm.

As one example, adjustment 228 involves selecting first position 234 and first orientation 236 for first image 218. Thereafter, second position 238 and second orientation 240 for second image 220 are adjusted relative to first position 234 and first orientation 236 of first image 218 in image pair 217 in plurality of image pairs 216. In these illustrative examples, first position 234, first orientation 236, second position 238, and second orientation 240 are for platform 201. In this manner, first image 218 and second image 220 are adjusted relative to each other. This process is discussed in greater detail in the description of FIG. 8 below.

In these illustrative examples, the position of platform 201 is a three-dimensional position. The position may be described using, for example, without limitation, a latitude, a longitude, and an altitude of platform 201. An orientation of platform 201 is, more specifically, an orientation of video camera system 202 associated with platform 201. In these examples, the orientation of platform 201 is described using rotations about three axes. These three axes may be, for example, roll, pitch, and yaw. When platform 201 is an aircraft, the orientation of platform 201 is attitude 244. Of course, the position and orientation of platform 201 may be described using other types of coordinate systems such as, for example, quaternions.

In these illustrative examples, first position 234 and first orientation 236 may be provided by positioning system 243 associated with platform 201. Positioning system 243 may include at least one of a global positioning system, an inertial positioning system, a gyroscopic system, and/or some other suitable type of positioning system.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

For example, positioning system 243 may include a global positioning system to provide first position 234 and a gyroscopic system to provide first orientation 236. In some illustrative embodiments, positioning system 243 also provides second position 238 and second orientation 240.

In these illustrative examples, another portion of adjustment 228 involves adjusting adjusted image pair 242 for viewing such that perception of depth 232 is provided. This adjustment may be performed using a process referred to as epipolar warping 245. Epipolar warping 245 involves selecting portion 241 of adjusted image pair 242 in plurality of adjusted image pairs 230 using number of common points 239 in adjusted image pair 242. This type of selection is made for each adjusted image pair in plurality of adjusted image pairs 230. In this manner, plurality of adjusted image pairs 230 is configured to provide perception of depth 232 when viewed. This process is discussed in greater detail in FIG. 9 below.

Adjustment 228 is performed such that the two images in adjusted image pair 242 have differences that allow depth to be perceived. In other words, adjustment 228 generates adjusted image pair 242 to provide perception of depth 232 for scene 206 when properly viewed.

In these illustrative examples, adjustment 228 also may increase perception of depth 232 beyond what viewer 250 would normally see in the real world. For example, this increase in perception of depth 232 may be dependent on the value selected for desired overlap 226 between first image 218 and second image 220. An increase in perception of depth 232 would allow more information to be presented to viewer 250 as compared to a real-world perception of depth. For example, features of interest on number of objects 208 may be magnified with an increase in perception of depth 232.

In this illustrative example, plurality of adjusted image pairs 230 is sent in video data stream 247 to display system 248. Video data stream 247 is a stereoscopic video data stream in this example. Display system 248 is configured to present plurality of adjusted image pairs 230 in video data stream 247 in the form of plurality of stereoscopic images 249 to viewer 250.

For example, the images in adjusted image pair 242 are presented by display system 248 in a manner such that viewer 250 sees stereoscopic image 252 in plurality of stereoscopic images 249. Stereoscopic image 252 provides viewer 250 with perception of depth 232 for scene 206. In other words, stereoscopic image 252 provides viewer 250 with a perception of scene 206 in three dimensions.

Plurality of stereoscopic images 249 is generated in the sequence that plurality of images 211 was generated. This sequence allows plurality of stereoscopic images 249 to form stereoscopic video 254 of scene 206. Stereoscopic video 254 provides perception of depth 232 for scene 206.

In this illustrative example, display system 248 may include a number of devices configured to allow viewer 250 to view stereoscopic video 254. For example, display system 248 may include hardware device 255 configured to process video data stream 247. Hardware device 255 may be, for example, without limitation, a video adapter, a digital signal processor, and/or some other suitable hardware component.

Hardware device 255 sends video data stream 247 to display device 256 in display system 248 for viewing. In these examples, display device 256 may be a display screen, a monitor, a projection screen, and/or some other suitable display device.

In other illustrative embodiments, display system 248 may be a head-mounted device such as, for example, linearly polarized glasses, circularly polarized glasses, anachrome optical glasses, or some other suitable type of device. In some illustrative embodiments, display system 248 may be a computer with a display device, such as a flat screen monitor. This computer may display stereoscopic video 254 using, for example, autostereograms, a Pulfrich effect paradigm, or wiggle stereoscopy.

The illustration of video imaging environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, video camera system 202 may include additional video cameras in addition to monoscopic video camera 214. These additional video cameras may be used to gather information about additional scenes in addition to scene 206. In other illustrative embodiments, positioning system 243 may be located remote to platform 201. For example, positioning system 243 may be associated with a satellite station, a ground station, or some other suitable location remote to platform 201.

Figure 3:
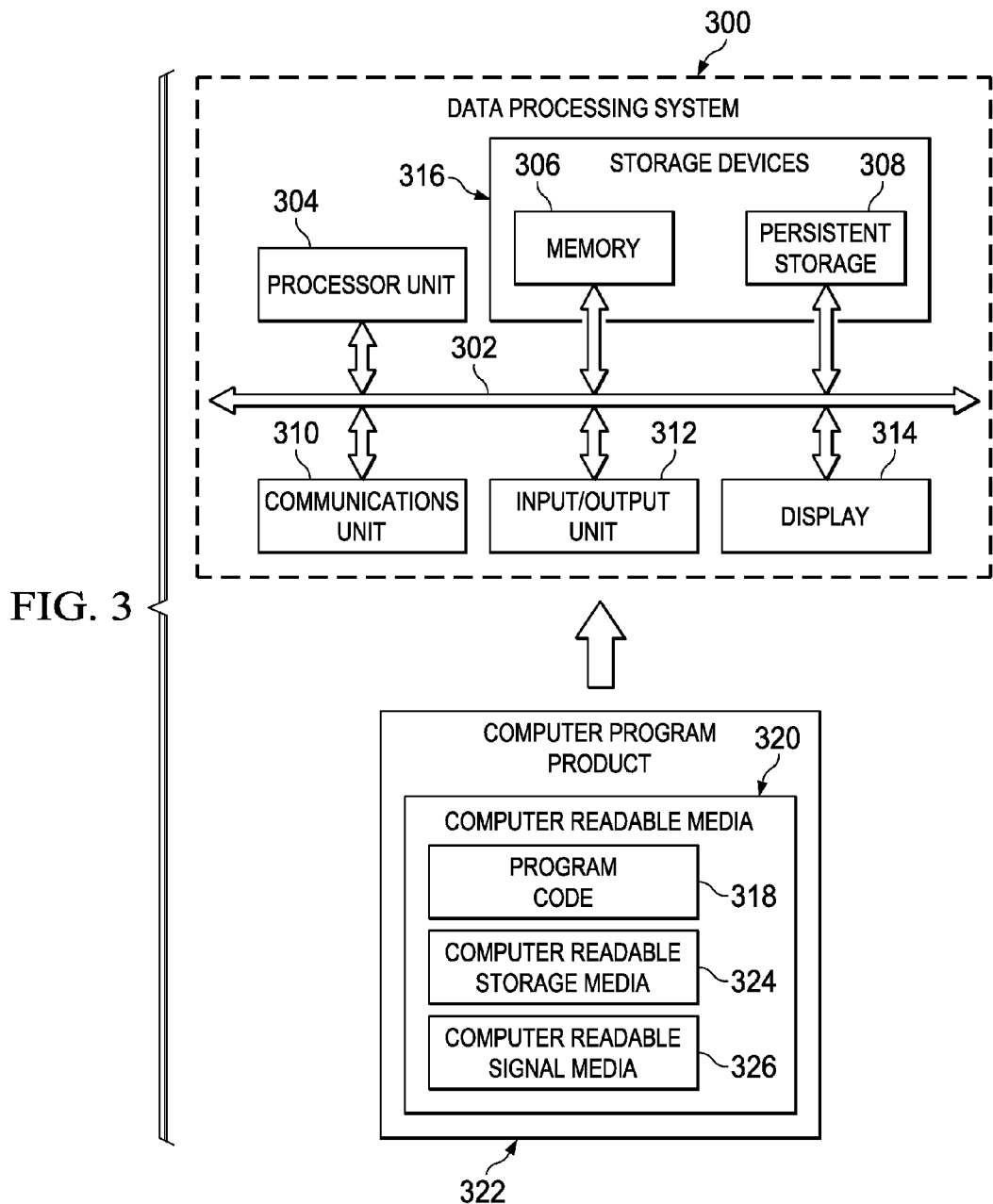
FIG. 3 is an illustration of a data processing system in accordance with an illustrative embodiment.

Turning now to FIG. 3, an illustration of a data processing system is depicted in accordance with an illustrative embodiment. In this illustrative example, data processing system 300 is an example of one implementation for computer system 204 in FIG. 2. Data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multiprocessor core, depending on the particular implementation. Further, processor unit 304 may be implemented using one or more heterogeneous processor systems, in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory, or any other suitable volatile or non-volatile storage device.

Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communications unit 310, in these examples, provides for communication with other data processing systems or devices. In these examples, communications unit 310 is a network interface card. Communications unit 310 may provide communications through the use of either or both physical and wireless communications links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. These instructions may include instructions for program 215 in FIG. 2.

In these illustrative examples, the instructions are in a functional form on persistent storage 308. These instructions may be loaded into memory 306 for execution by processor unit 304. The processes of the different embodiments may be performed by processor unit 304 using computer-implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326.

Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300.

Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
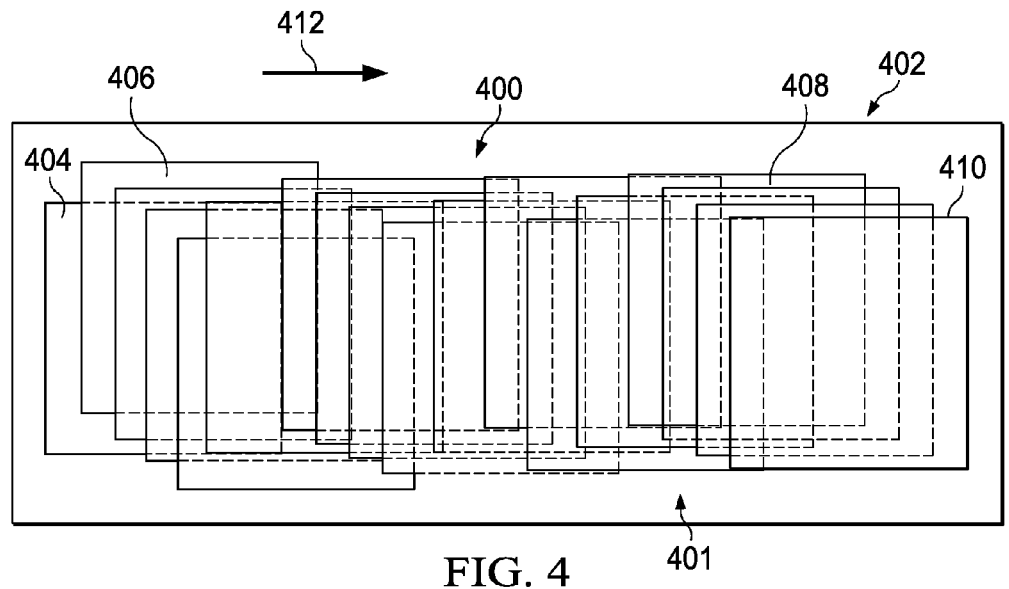
FIG. 4 is an illustration of images in a video data stream in accordance with an illustrative embodiment.

With reference now to FIG. 4, an illustration of images in a video data stream is depicted in accordance with an illustrative embodiment. In this illustrative example, video data stream 400 is an example of one implementation of video data stream 210 in FIG. 2. Video data stream 400 is generated for scene 402 by a platform such as, for example, without limitation, platform 201 in FIG. 2.

In this depicted example, video data stream 400 includes plurality of images 401. Plurality of images 401 includes images, such as image 404, image 406, image 408, and image 410. Plurality of images 401 for video data stream 400 is generated in a sequence in the direction of arrow 412. Each image in plurality of images 401 is an image of an area in scene 402. Plurality of images 401 is generated at a frequency of about 30 images per second or about 30 Hertz in this example.

In this illustrative example, the platform moves across scene 402 with a speed of about 25 meters per second. As a result, each image in plurality of images 401 is taken about 0.8333 meters farther in scene 402 in the direction of arrow 412 than a preceding image in plurality of images 401.

Figure 5:
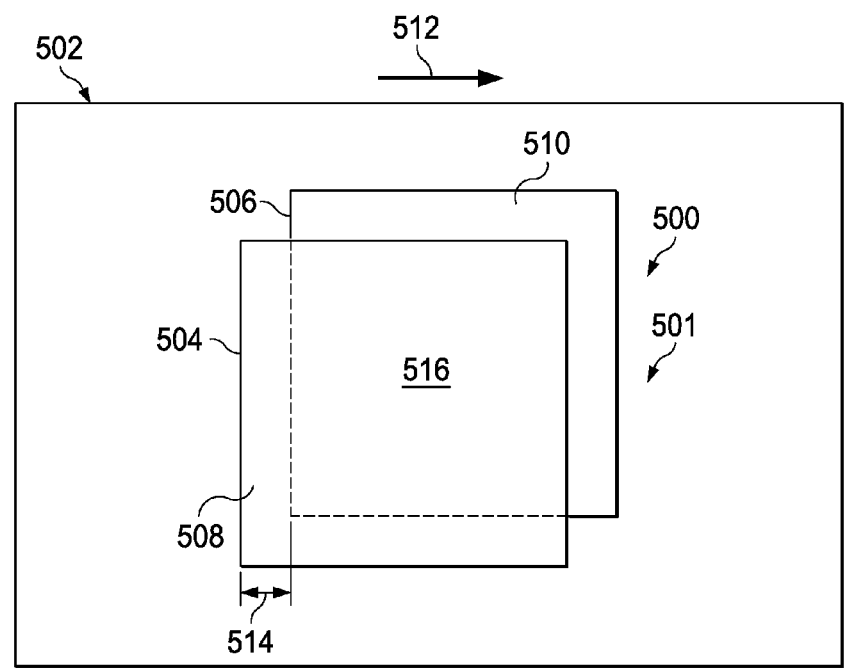
FIG. 5 is an illustration of images in a video data stream in accordance with an illustrative embodiment.

With reference now to FIG. 5, an illustration of images in a video data stream is depicted in accordance with an illustrative embodiment. In this illustrative example, video data stream 500 is an example of a portion of video data stream 400 in FIG. 4. Video data stream 500 comprises plurality of images 501 of scene 502.

Image 504 may be one example of image 404 in FIG. 4, and image 506 may be one example of image 406 in plurality of images 401 in FIG. 4. Image 504 is an image of area 508 in scene 502. Image 506 is an image of area 510 in scene 502. Both area 508 and area 510 are about 100 meters by about 100 meters. In other illustrative embodiments, the areas represented by images 504 and 506 in plurality of images 501 may be, for example, about 500 meters by about 500 meters.

In this illustrative example, plurality of images 501 is taken from a platform moving in the direction of arrow 512 over scene 502. The platform is moving at a speed of about 25 meters per second. Plurality of images 501 is generated at a frequency of about 30 images per second or about 30 Hertz in this example.

As depicted, area 510 is farther in the direction of arrow 512 from area 508 by distance 514. Distance 514 is about 0.8333 meters in this example. Further, distance 514 is about 0.8333 meters between consecutive images in plurality of images 501. Area 508 and area 510 overlap each other to form overlapped area 516. Overlapped area 516 may have an overlap of about 99 percent. As a result, image 504 and image 506 also overlap each other by about 99 percent in this example.

In the different illustrative embodiments, distance 514 is selected based on the desired overlap for overlapped area 516. For example, in some illustrative examples, distance 514 may be selected to provide about 60 percent overlap for image 504 and image 506. When area 508 and area 510 are about 500 meters by about 500 meters, distance 514 is selected as about 200 meters to provide about 60 percent overlap.

Figure 6:
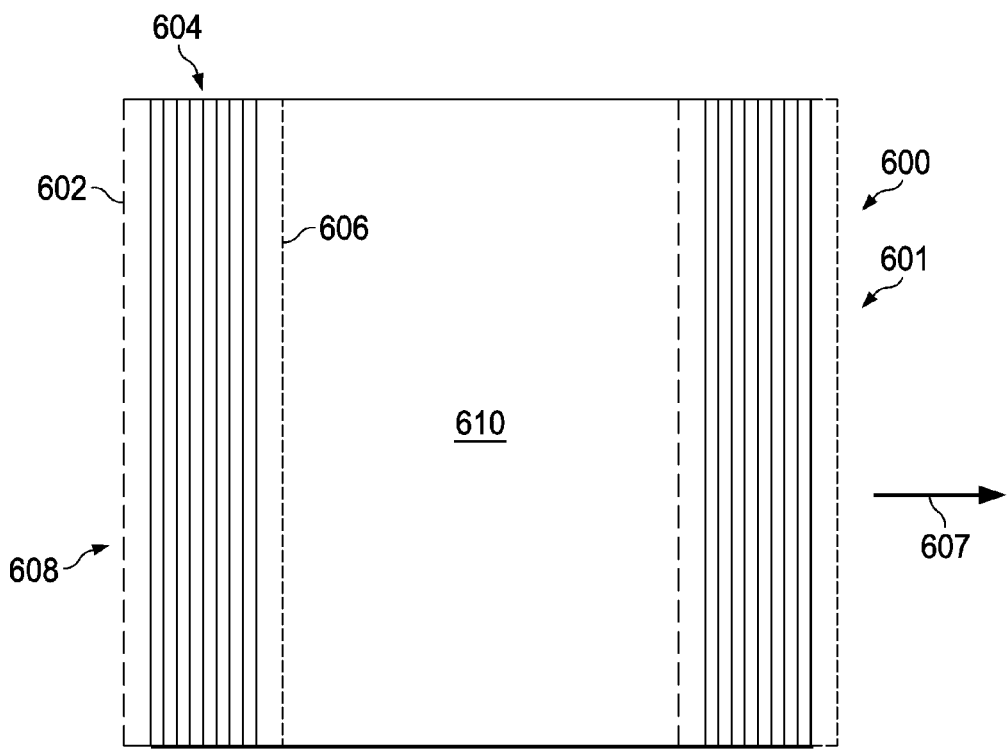
FIG. 6 is an illustration of a video data stream in accordance with an illustrative embodiment.

With reference now to FIG. 6, an illustration of a video data stream is depicted in accordance with an illustrative embodiment. In this illustrative example, video data stream 600 is an example of one implementation for video data stream 210 in FIG. 2. Video data stream 600 is generated using a video camera system, such as video camera system 202 in FIG. 2.

As depicted, video data stream 600 includes plurality of images 601. Plurality of images 601 is a plurality of monoscopic images in these illustrative examples. Plurality of images 601 is generated in a sequence in the direction of arrow 607. Plurality of images 601 in video data stream 600 includes, for example, first image 602, number of images 604, and second image 606. In these examples, first image 602 is the first image generated in the sequence of images in plurality of images 601 in video data stream 600.

A first image pair in plurality of images 601 is selected such that the image pair has a desired overlap. This desired overlap is about 60 percent. In this illustrative example, first image 602 and second image 606 are selected as first image pair 608. First image pair 608 is the first image pair selected from the sequence of images in plurality of images 601.

First image 602 and second image 606 overlap each other to form overlapped portion 610 with about a 60 percent overlap. In these illustrative examples, number of images 604 may be 240 images. This number of images in number of images 604 may be chosen to provide overlapped portion 610 with an overlap of about 60 percent. In other words, in this example, having more than 240 images between first image 602 and second image 606 provides a decreased overlap as compared to fewer than 240 images.

The period of time between the generation of first image 602 and the generation of second image 606 leads to a time delay in the selection of first image pair 608. This time delay may be estimated using the following equation:

$$\text{time delay} = (\text{length} * (1 - \text{overlap})) / (\text{speed}). \qquad (1)$$

In this equation, length is a length of the area represented by an image in plurality of images 601, overlap is the overlap for overlapped portion 610, and speed is the speed of the platform having the video camera system generating video data stream 600. The overlap is a percent of overlap expressed as a fraction. When the platform is an aircraft, the speed may be airspeed.

Figure 7:
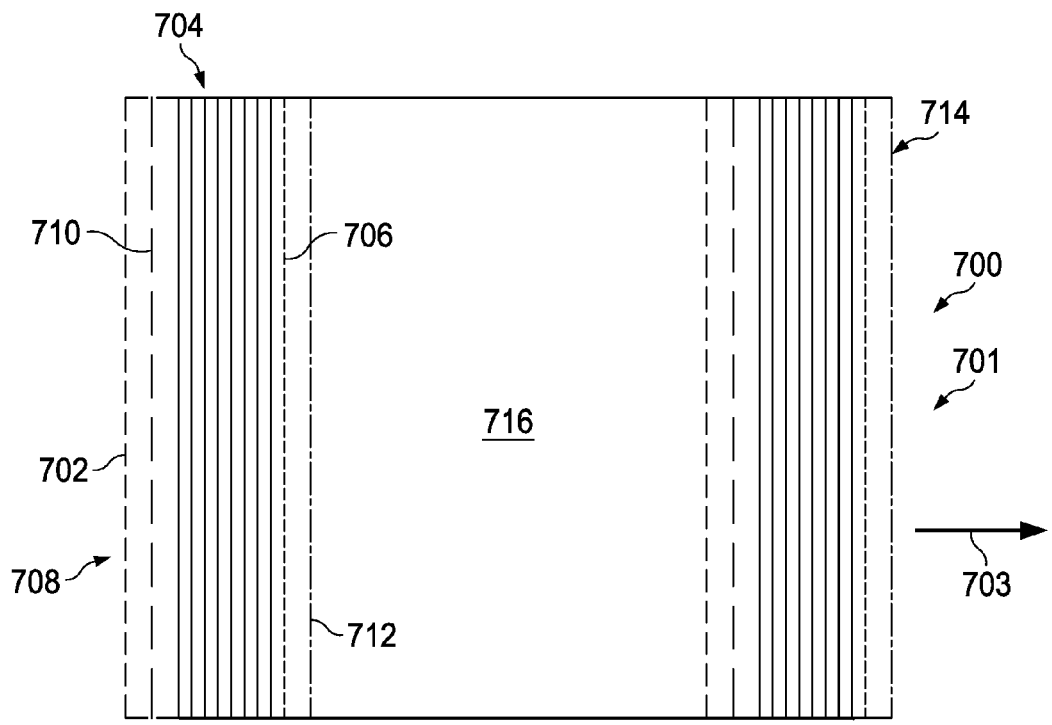
FIG. 7 is an illustration of a video data stream in accordance with an illustrative embodiment.

With reference now to FIG. 7, an illustration of a video data stream is depicted in accordance with an illustrative embodiment. In this illustrative example, video data stream 700 is an example of a video data stream, such as video data stream 600 in FIG. 6. As depicted, video data stream 700 is depicted at a later point in time in the generation of the video data stream, as compared to video data stream 600 in FIG. 6.

As depicted, video data stream 700 includes plurality of images 701. Plurality of images 701 includes an additional image as compared to the number of images in plurality of images 601 in FIG. 6. Plurality of images 701 is generated in a sequence in the direction of arrow 703. Plurality of images 701 in video data stream 700 includes, for example, first image 702, number of images 704, and second image 706. In these examples, first image 702 is the first image generated in the sequence of images in plurality of images 701.

In this illustrative example, first image 702 and second image 706 are selected as first image pair 708. First image pair 708 is the first image pair selected from the sequence of images in plurality of images 701. First image 702 and second image 706 have an overlap of about 60 percent.

As depicted, a second image pair is selected from plurality of images 701 such that the second image pair has substantially the same overlap as first image pair 708. Third image 710 is the next image generated in the sequence after first image 702. Fourth image 712 is the next image generated in the sequence after second image 706.

Third image 710 and fourth image 712 are selected as second image pair 714 with overlapped portion 716. Second image pair 714 is the next image pair selected in the sequence after first image pair 708. Number of images 704 between third image 710 and fourth image 712 are 240 images, similar to number of images 604 in FIG. 6. Number of images 704 is selected to provide an overlap of about 60 percent in overlapped portion 716.

The processing of image pairs selected from plurality of images 701 is performed by a computer system, such as computer system 204 in FIG. 2. In these illustrative examples, first image pair 708 is adjusted by an adjustment, such as adjustment 228 in FIG. 2. First image pair 708 is adjusted based on a position and an orientation of the platform taking video data stream 700. The position and orientation of the platform may be provided by a positioning system, such as positioning system 243 in FIG. 2.

The positioning system may provide the position and orientation of the platform for certain periods of time. These periods of time may be fixed or variable. Adjustment 228 in FIG. 2 is made for second image pair 714 using the position and orientation of the platform as provided by the positioning system at the time of imaging of second image pair 714. A number of image pairs selected from plurality of images 701 are adjusted in a similar manner until the next period of time that the positioning system provides the position and orientation of the platform. This type of adjustment may be referred to as interpolation. The interpolation also may involve using, for example, a least squares algorithm.

Figure 8:
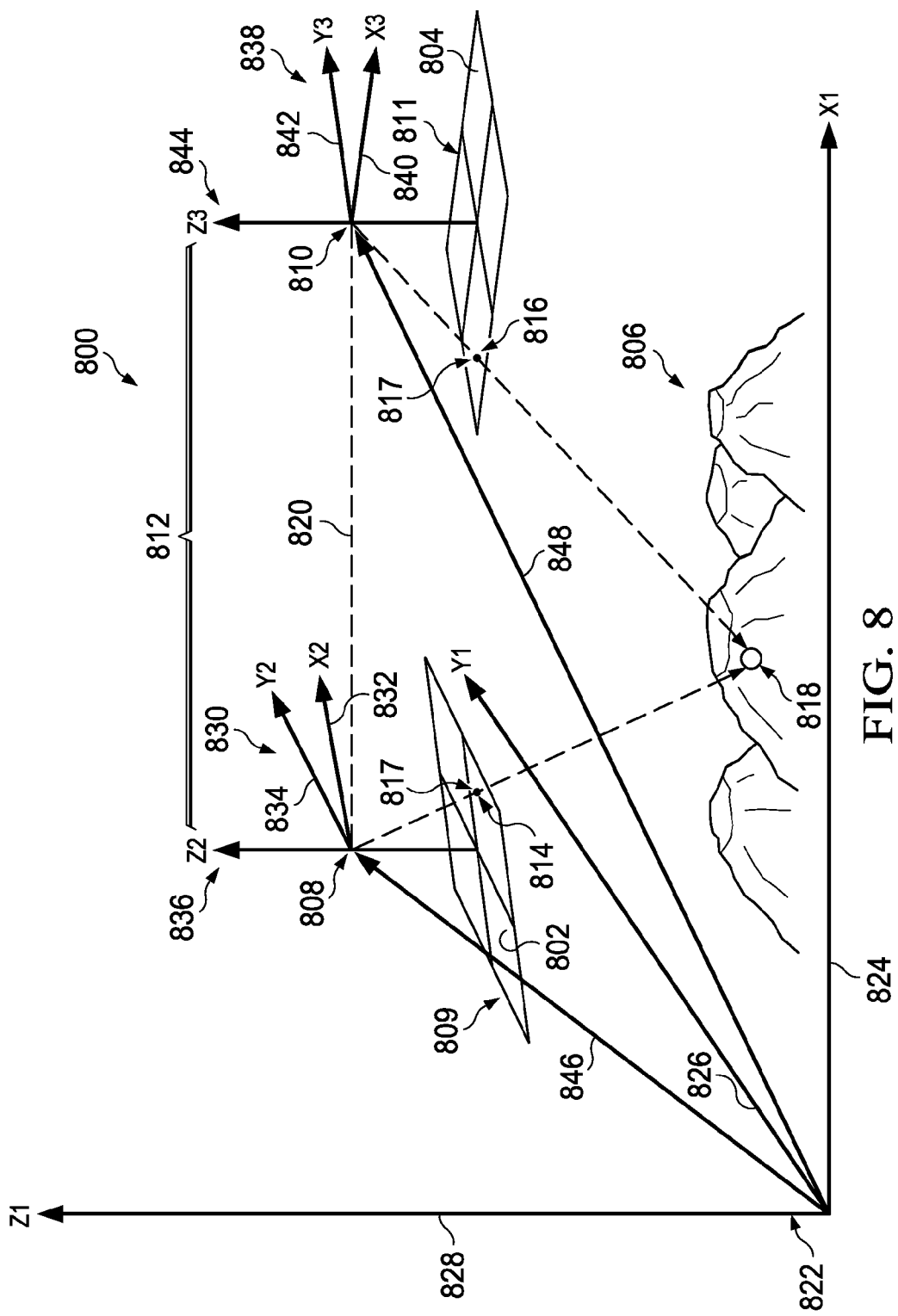
FIG. 8 is an illustration of an adjustment of an image pair in accordance with an illustrative example.

With reference now to FIG. 8, an illustration of an adjustment of an image pair is depicted in accordance with an illustrative example. In this illustrative example, image pair 800 is adjusted using an adjustment, such as adjustment 228 in FIG. 2. Image pair 800 may be generated by a video camera system associated with a platform, such as video camera system 202 associated with platform 201 in FIG. 2. Image pair 800 includes first image 802 and second image 804.

First image 802 and second image 804 are images of scene 806. Scene 806 is a region of land in this example. First image 802 has first position 808 and first orientation 809, and second image 804 has second position 810 and second orientation 811. Distance 812 is the distance between first position 808 and second position 810.

In this illustrative example, point 814 in first image 802 and point 816 in second image 804 are identified for point 818 in scene 806. In these illustrative examples, point 814 and point 816 are pixels. Point 818 may be, for example, a position of an object at a scene, a location on an object, a feature on an object, or some other suitable point. Point 814 and point 816 may be identified based on, for example, a pattern matching algorithm that matches a pattern of point 818 to point 814 and point 816. Point 814 includes data for point 818 in scene 806. Point 816 also includes data for point 818 in scene 806. In this example, point 814, point 816, and point 818 lie in plane 820.

As depicted in this example, scene 806 has coordinate system 822 with X1 axis 824, Y1 axis 826, and Z1 axis 828. First image 802 has coordinate system 830 with X2 axis 832, Y2 axis 834, and Z2 axis 836. Second image 804 has coordinate system 838 with X3 axis 840, Y3 axis 842, and Z3 axis 844. Vector 846 is the position vector for position 808 with respect to coordinate system 822 for scene 806. Vector 848 is the position vector for position 810 with respect to coordinate system 822 for scene 806.

At least one of first image 802 and second image 804 may be adjusted relative to each other. In this illustrative example, second image 804 is adjusted relative to first image 802. In particular, second position 810 and second orientation 811 of second image 804 are adjusted relative to first position 808 and first orientation 809 of first image 802. In other words, first position 808 and first orientation 809 form a reference position and a reference orientation used to make changes to second position 810 and second orientation 811. In this manner, second image 804 is adjusted relative to first image 802.

In this example, first position 808 and first orientation 809 are provided by a positioning system such as, for example, positioning system 243 in FIG. 2. More specifically, the positioning system provides data for the position and the orientation of the platform. This data is used to provide estimates for first position 808 and first orientation 809 through a process such as interpolation. These estimates are used to adjust second image 804 relative to first image 802.

In some illustrative embodiments, both first image 802 and second image 804 are adjusted relative to each other. In these examples, the positioning system provides data for the position and orientation of the platform. This data is used to provide estimates for first position 808, first orientation 809, second position 810, and second orientation 811 through interpolation. Further, first image 802 and second image 804 are both adjusted using a least squares algorithm. The adjustment of both first image 802 and second image 804 may allow the determination of more accurate positions and orientations as compared to the adjustment of second image 804 relative to first image 802.

For image pair 800, point 814 and point 816 may form related point 817. In other words, point 814 and point 816 both correspond to point 818. Related point 817 may be related to two scalar equations for each image in image pair 800. Thus, for an N number of related points for image pair 800, four scalar equations are present for each of N related points. In this depicted example, four scalar equations are present for related point 817.

When making adjustments to a plurality of image pairs, a number of scalar equations that is greater than or equal to the number of unknowns is desired. The position of a platform is based on latitude, longitude, and altitude. The position of the platform may present at least two unknowns. In these illustrative examples, one unknown may be based on altitude, and the other unknown may be based on one of latitude, longitude, and a combination of latitude and longitude. The orientation of the platform presents three unknowns. These three unknowns are based on rotations about three axes. These rotations are, for example, roll, pitch, and yaw. Further, each related point for an image pair presents three scalar unknowns.

In this manner, the total number of unknowns is equal to 5 plus 3N. Thus, the following equation is present for N related points in image pair 800:

$$4N \geq 5+3N, \qquad (2)$$

where N is the number of related points per image pair.

The equation may be solved such that at least five related points per image pair are selected for performing an adjustment to the image pair in this illustrative example. Of course, some other number of related points may be selected in other implementations. This adjustment may be performed using a least squares algorithm.

The adjustment to image pair 800 depends on a condition that point 814, point 816, and point 818 lie in plane 820. This condition is expressed by the following equation:

$$F_P(x_{P1}, y_{P1}, x_{P2}, y_{P2}, \vec{r}_1, \omega_1, \Phi_1, \kappa_1, \vec{r}_2, \omega_2, \Phi_2, \kappa_2) = (\vec{r}_2 - \vec{r}_1) \cdot (\vec{t}_{1P} \cdot \vec{t}_{2P}) = 0 \qquad (3)$$

In this equation, F is the condition, P is point 818, P1 is point 814, P2 is point 816, $x_{P1}$ is the coordinate of point 814 with respect to X2 axis 832, $y_{P1}$ is the coordinate of point 814 with respect to Y2 axis 834, $x_{P2}$ is the coordinate of point 816 with respect to X3 axis 840, and $y_{P2}$ is the coordinate of point 816 with respect to Y3 axis 842. Further, $\vec{r}_1$ is vector 846, $\vec{r}_2$ is vector 848, $\omega_1$ is the roll angle for the platform at first position 808, $\phi_1$ is the pitch angle for the platform at first position 808, $\kappa_1$ is the yaw angle for the platform at first position 808, $\omega_2$ is the roll angle for the platform at first position 808, $\phi_2$ is the pitch angle for the platform at first position 808, $\kappa_2$ is the yaw angle for the platform at first position 808, $\vec{t}_{1P}$ is the vector from first position 808 to point 818, and $\vec{t}_{2P}$ is the vector from second position 810 to point 818.

In this illustrative example, F is solved for a set of points similar to point 818 in scene 806 to form a set of conditions F for the set of related points in image pair 800. This set of conditions is expressed by the equations:

$$\vec{f}^T = [-F_1 - F_2 \bullet \bullet F_P \bullet - F_N], \text{ and} \tag{4}$$

$$\vec{f} = A\vec{v} + B\vec{v}. \tag{5}$$

In this equation, T indicates a transpose, $\vec{f}$ is the set of conditions F, A is a matrix, $\vec{v}$ is a vector, B is a matrix, and $\vec{\Delta}$ is a vector.

In this illustrative example, $\vec{v}$ represents the errors that may be present after first image 802 and second image 804 are adjusted relative to each other. In particular, these errors are residual errors from the performing of the least squares algorithm. In this illustrative, example, $\vec{v}$ is partitioned by the following equation:

$$\vec{v}^T = = [\vec{v}_1^T \vec{v}_2^T \bullet \bullet \vec{v}_P^T \bullet \vec{v}_N^T] \tag{6}$$

In this equation, each entry in $\vec{v}_P$, is further partitioned to provide residual errors for each related point, such as related point 817. For example, each entry of $\vec{v}_P$, may be partitioned into the following vector:

$$\vec{v}_P = = [v_{Px1} \, v_{Py1} \, v_{Px2} \, v_{Py2}] \tag{6}$$

where ($v_{Px1}$, $v_{Py1}$) is the residual error for related point 817 on first image 802, and ($v_{Px2}$, $v_{Py2}$) is the residual error for related point 817 on second image 804.

In this depicted example, $\vec{\Delta}$ represents the adjustments that must be made to second image 804. These adjustments also may be made to the ground coordinates of point 818. In this example, $\vec{\Delta}$ is partitioned as follows:

$$\vec{\Delta}^T = [\vec{\Delta}_1^T : \vec{\Delta}_2^T]^T \tag{8}$$

Vector $\vec{\Delta}_1$ represents corrections for second position 810 and second orientation 811 in second image 804.

Vector $\vec{\Delta}_2$ represents corrections to the ground coordinates of point 818.

Further, $\vec{\Delta}^T$ is partitioned by a combination of the following three equations:

$$\vec{\Delta}_1 = = [\delta r_{2y} \, \delta r_{2z} \, \delta \omega_2 \, \delta \phi_2 \, \delta \kappa_2] \tag{9}$$

$$\vec{\Delta}_2^T = = [\vec{\delta t}_1^T \vec{\delta t}_2^T \bullet \bullet \vec{\delta t}_P^T \bullet \bullet \bullet \vec{\delta t}_N^T] \tag{10}$$

$$\vec{\delta t}_P^T = [\delta t_{Px} \, \delta t_{Py} \, \delta t_{Pz}], P = 1, N. \tag{11}$$

The adjustments that are to be made to second image 804 are solved by performing a least squares adjustment algorithm using the following set of equations:

$$\vec{\Delta}_k = [B_k^T (A_k A_k^T)^{-1} B_k]^{-1} [B_k^T (A_k A_k^T)^{-1} \vec{f}_k], \tag{12}$$

$$\vec{v}_k = A_k^T (A_k A_k^T)^{-1} (\vec{f}_k - B_k \vec{\Delta}_k), \text{ and}$$

$$\vec{m}_2 = \vec{m}_{20} + \sum_{j=1}^{k} \vec{\Delta}_{1j}.$$

In this set of equations, $\vec{m}_2$ is the adjustment that is to be made for second position 810 in second image 804, $\vec{m}_{20}$ is the adjustment that is to be made for second orientation 811, and k is the kth iteration for performing the least squares algorithm. In these examples, less than five iterations are performed.

Figure 9:
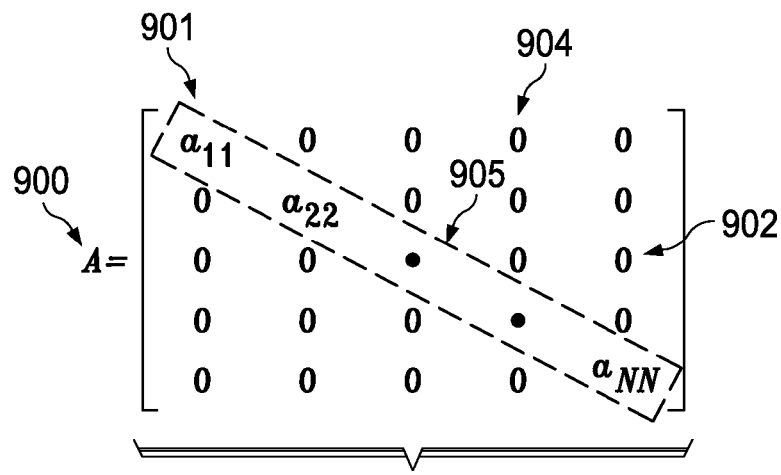
FIG. 9 is an illustration of a matrix in accordance with an illustrative embodiment.

With reference now to FIG. 9, an illustration of a matrix is depicted in accordance with an illustrative embodiment. In this illustrative example, matrix 900 is an example of an implementation for the matrix A as described by equation 6.

Matrix 900 is an N×4N matrix, where N is the number of points in the set of points being used to make the adjustment to image pair 800 in FIG. 8. Matrix 900 has entries 901 that fill rows 902 and columns 904.

In this illustrative example, entries 901 are filled by taking the partial derivatives of the condition F as described in equation 4, with respect to $x_{P1}$, $y_{p1}$, $x_{P1}$, and $y_{P2}$. Diagonal entries 905 of entries 901 are populated by the following partial derivatives:

$$a_{PP} = \left[ \frac{\partial F_P}{\partial x_{P1}} \frac{\partial F_P}{\partial y_{P1}} \frac{\partial F_P}{\partial x_{P2}} \frac{\partial F_P}{\partial y_{P2}} \right], P = 1, N \tag{13}$$

Figure 10:
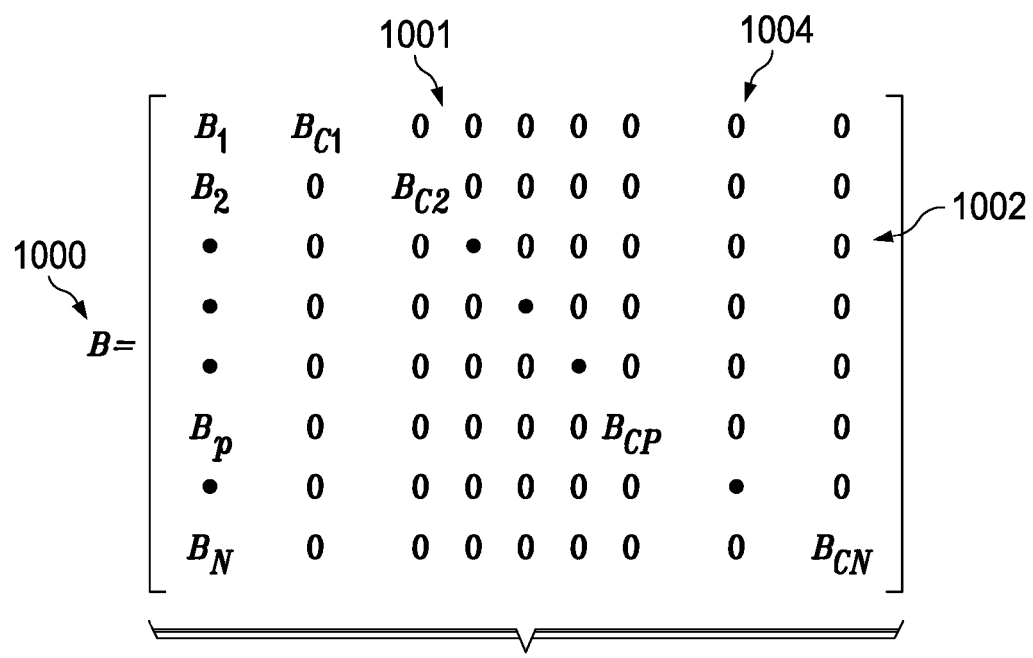
FIG. 10 is an illustration of a matrix in accordance with an illustrative embodiment.

With reference now to FIG. 10, an illustration of a matrix is depicted in accordance with an illustrative embodiment. In this illustrative example, matrix 1000 is an example of an implementation for the matrix B as described by equation 6.

Matrix 1000 is an N×(5+3N) matrix, where N is the number of points in the set of points being used to make the adjustment to image pair 800 in FIG. 8. Matrix 1000 has entries 1001 that fill rows 1002 and columns 1004.

In this illustrative example, entries 1001 are filled by taking the partial derivatives of the condition F as described in equation 4. These partial derivatives are expressed in the following two equations:

$$B_P = \left[ \frac{\partial F_P}{\partial \vec{r}_{2y}} \frac{\partial F_P}{\partial \vec{r}_{2z}} \frac{\partial F_P}{\partial \omega_2} \frac{\partial F_P}{\partial \phi_2} \frac{\partial F_P}{\partial \kappa_2} \right], P = 1, N, \text{ and} \tag{14}$$

$$B_{CP} = \left[ \frac{\partial F_P}{\partial t_{Px}} \frac{\partial F_P}{\partial t_{Py}} \frac{\partial F_P}{\partial t_{Pz}} \right] P = 1, N. \tag{15}$$

Figure 11:
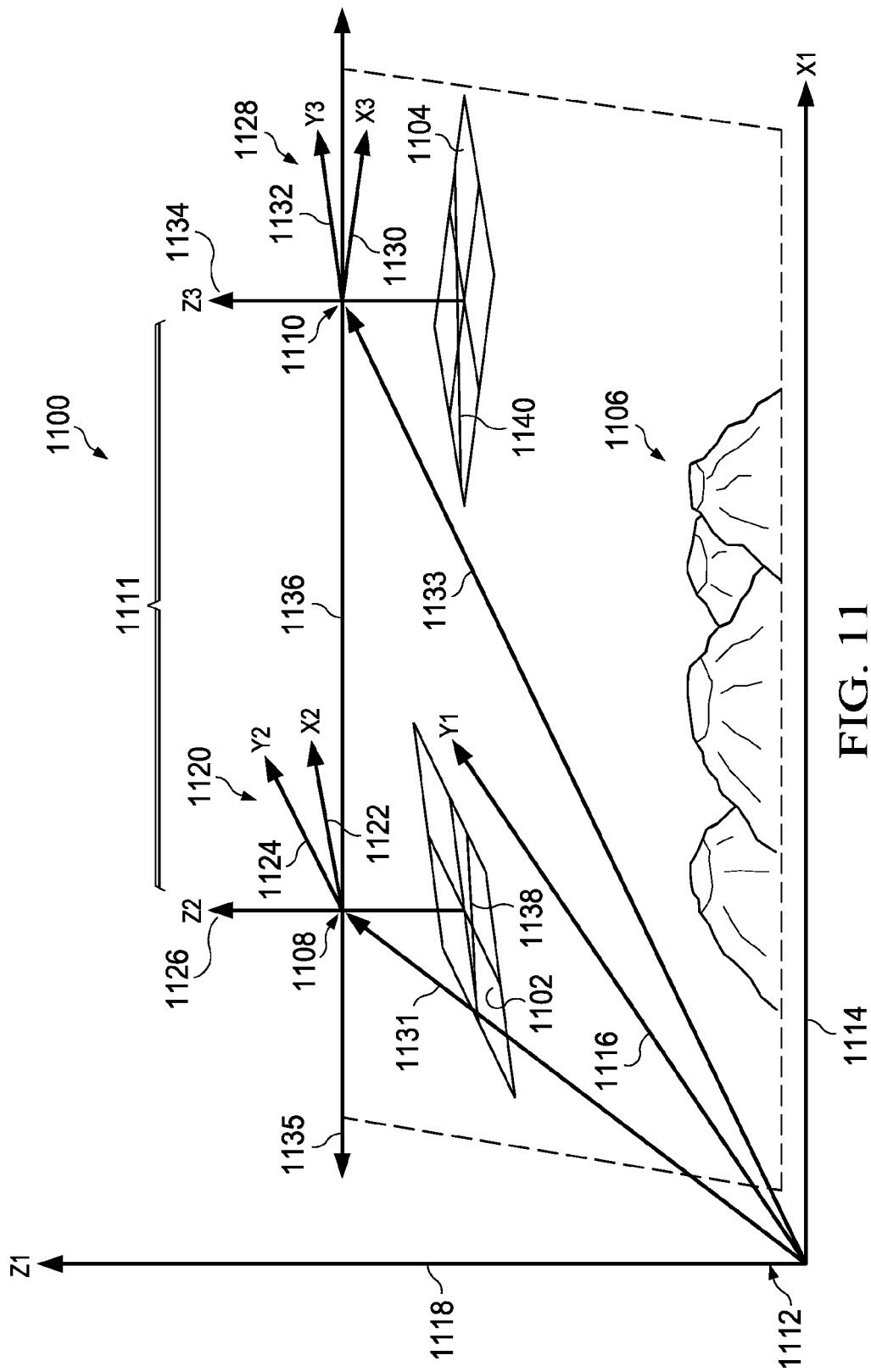
FIG. 11 is an illustration of selection of a portion of an adjusted image pair for viewing in accordance with an illustrative embodiment.

With reference now to FIG. 11, an illustration of selection of a portion of an adjusted image pair for viewing is depicted in accordance with an illustrative embodiment. In this illustrative example, adjusted image pair 1100 is depicted after a first adjustment, such as adjustment 228 in FIG. 2, has been implemented. In this illustrative example, adjustment 228 in FIG. 2 may be made to adjusted image pair 1100 by computer system 204 in FIG. 2.

Adjusted image pair 1100 includes first adjusted image 1102 and second adjusted image 1104.

First adjusted image 1102 and second adjusted image 1104 are images of scene 1106. Scene 1106 is a region of land in this example. First adjusted image 1102 has position 1108, and second adjusted image 1104 has position 1110. Distance 1111 is the distance between first adjusted position 1108 and second adjusted position 1110.

As depicted in this example, scene 1106 has coordinate system 1112 with X1 axis 1114, Y1 axis 1116, and Z1 axis 1118. First adjusted image 1102 has coordinate system 1120 with X2 axis 1122, Y2 axis 1124, and Z2 axis 1126. Second adjusted image 1104 has coordinate system 1128 with X3 axis 1130, Y3 axis 1132, and Z3 axis 1134. Vector 1131 is the position vector for position 1108 with respect to coordinate system 1112 for scene 1106. Vector 1133 is the position vector for position 1110 with respect to coordinate system 1112 for scene 1106.

In this illustrative example, a portion of adjusted image pair 1100 is selected for viewing. In this example, axis 1135 passes through position 1108 and position 1110. Plane 1136 rotates around axis 1135. As plane 1136 rotates around axis 1135, plane 1136 intersects scene 1106, first adjusted image 1102, and second adjusted image 1104. In this depicted example, the intersection of plane 1136 with first adjusted image 1102 and second adjusted image 1104 generates a number of common points between adjusted image pair 1100.

For example, as plane 1136 passes through first adjusted image 1102, a line of points in first adjusted image 1102 is formed. This line of points is line 1138. In a similar manner, as plane 1136 passes through second adjusted image 1104, a line of points in second adjusted image 1104 is formed. This line of points is line 1140. Line 1138 and line 1140 in first adjusted image 1102 and in second adjusted image 1104, respectively, have a number of common points. In other words, line 1138 and line 1140 share a number of common points. As plane 1136 passes through adjusted image pair 1100, the number of common points is identified to select a portion of adjusted image pair 1100 for viewing. The selected portion of adjusted image pair 1100 has differences that allow depth to be perceived by a viewer.

The selected portion of adjusted image pair 1100 may then be sent to a display system, such as display system 248 in FIG. 2, for viewing as a stereoscopic image.

Figure 12:
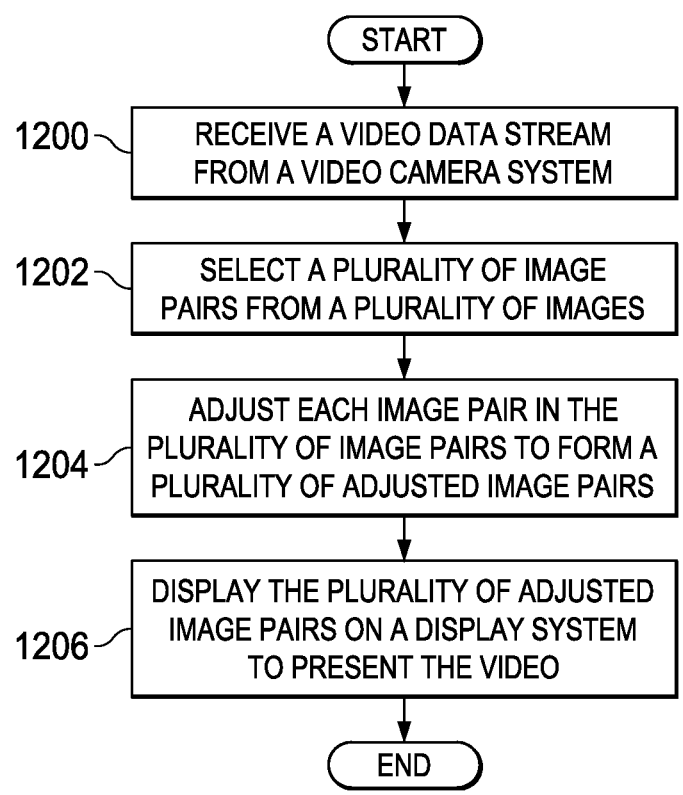
FIG. 12 is an illustration of a flowchart of a method for processing a video data stream in accordance with an illustrative embodiment.

With reference now to FIG. 12, a flowchart of a method for processing a video data stream is depicted in accordance with an illustrative embodiment. The process illustrated in FIG. 12 may be implemented in video imaging environment 200 in FIG. 2. In particular, the process may be implemented using video camera system 202 and computer system 204 in FIG. 2.

The process begins by receiving a video data stream from a video camera system (operation 1200). In these illustrative examples, the video camera system is a monoscopic video camera that is stationary on a platform. In other words, the monoscopic video camera does not move on the platform. The video data stream comprises a plurality of images of a scene. In this illustrative example, the video camera system may be associated with the platform. The process then selects a plurality of image pairs from the plurality of images (operation 1202). A first image of a first area in the scene overlaps a second image of a second area in the scene in each image pair in the plurality of image pairs.

Thereafter, the process adjusts each image pair in the plurality of image pairs to form a plurality of adjusted image pairs (operation 1204). The plurality of adjusted image pairs is configured to provide a perception of depth for the scene when presented as a video. The plurality of image pairs may be adjusted using, for example, adjustment 228 in FIG. 2.

The process then displays the plurality of adjusted image pairs on a display system to present the video (operation 1206), with the process terminating thereafter. In operation 1206, the perception of depth for the scene is provided to a viewer of the video. The video is a stereoscopic video in these examples. In these illustrative examples, a plurality of stereoscopic images forms the stereoscopic video of the scene to provide information, such as the perception of depth for the scene.

Figure 13:
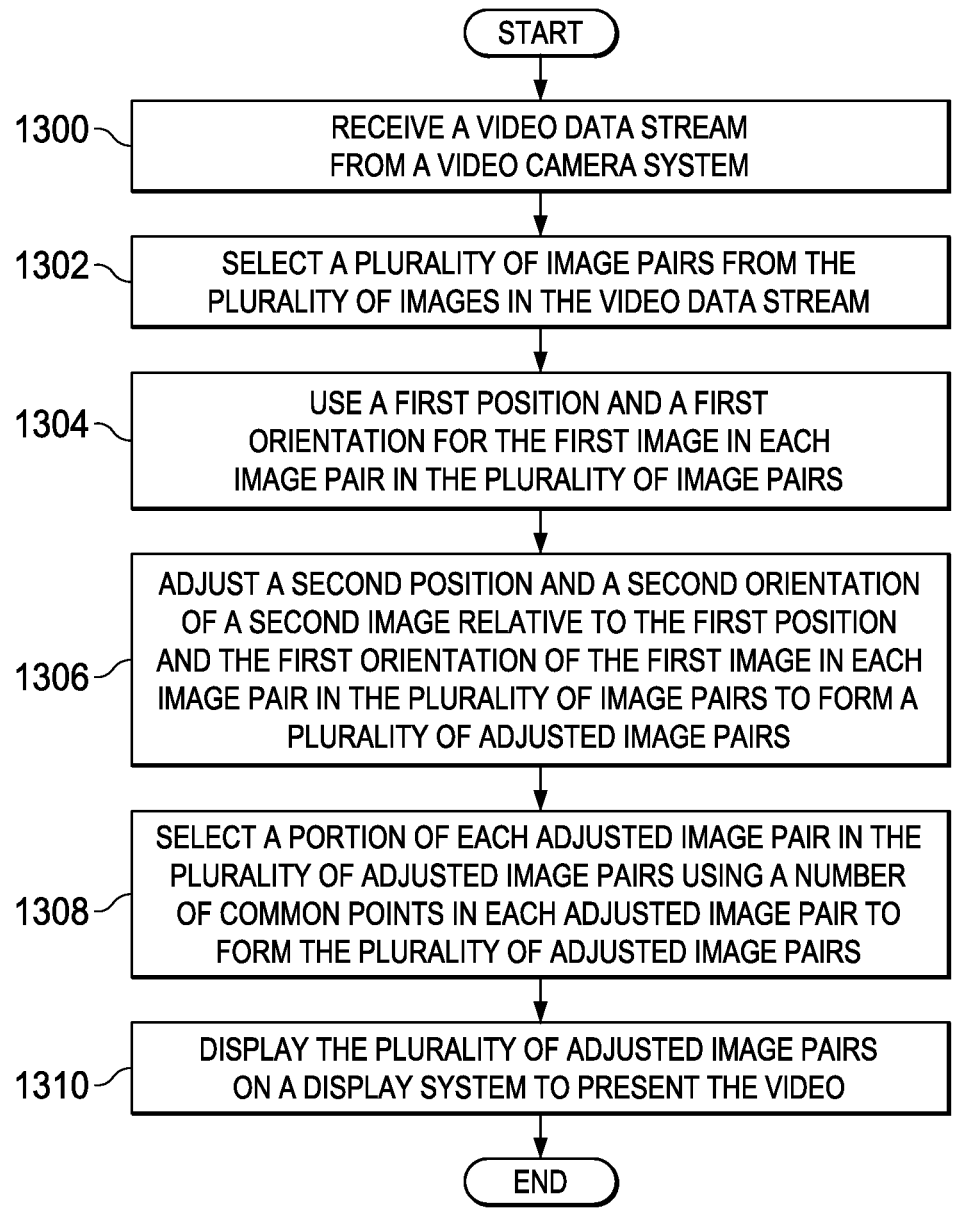
FIG. 13 is an illustration of a flowchart of a method for processing a video data stream in accordance with an illustrative embodiment.

With reference now to FIG. 13, a flowchart of a method for processing a video data stream is depicted in accordance with an illustrative embodiment. The process illustrated in FIG. 13 may be implemented in video imaging environment 200 in FIG. 2. In particular, the process may be implemented using video camera system 202 and computer system 204 in FIG. 2.

The process begins by receiving a video data stream from a video camera system (operation 1300). The video camera system may be associated with a platform moving over a scene. The video data stream may comprise a plurality of images of the scene. The process then selects a plurality of image pairs from the plurality of images in the video data stream (operation 1302). Each image pair in the plurality of image pairs may be selected such that a first image in the image pair overlaps a second image in the image pair with a desired overlap.

Thereafter, the process uses the first position and a first orientation for the first image in each image pair in the plurality of image pairs (operation 1304). In operation 1304, the first position and the first orientation may be interpolated based upon position and attitude determined using a least squares adjustment of the first image pair selected in the sequence. The process then adjusts a second position and a second orientation of the second image relative to the first position and the first orientation of the first image in each image pair in the plurality of image pairs to form a plurality of adjusted image pairs (operation 1306). In these examples, the first position, the first orientation, the second position, and the second orientation are for a platform.

Thereafter, the process selects a portion of each adjusted image pair in the plurality of adjusted image pairs using a number of common points in each adjusted image pair to form the plurality of adjusted image pairs (operation 1308). The process executed in operation 1308 is performed using epipolar warping in these illustrative examples.

The process then displays the plurality of adjusted image pairs on a display system to present the video (operation 1310), with the process terminating thereafter. The perception of depth for the scene is provided to a viewer of the video in operation 1310. The video is a stereoscopic video. In this illustrative example, a plurality of stereoscopic images forms the stereoscopic video of the scene to provide additional information that may not be available with monoscopic video. In these examples, the additional information includes a perception of depth for the scene. The perception of depth for the scene may include, for example, a depth between objects in the scene, a depth between different parts of an object in the scene, and/or other suitable information including depth in the scene.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. In addition, operations not shown may be included.

Thus, the different advantageous embodiments provide a method and apparatus for processing a video data stream. The video data stream is received from a video camera system. The video data stream comprises a plurality of images of a scene. A plurality of image pairs is selected from the plurality of images. A first image of a first area in the scene overlaps a second image of a second area in the scene in each image pair in the plurality of image pairs. Each image pair in the plurality of image pairs is adjusted to form a plurality of adjusted image pairs. The plurality of adjusted image pairs is configured to provide a perception of depth for the scene when the plurality of adjusted image pairs is presented as a video.

The different embodiments can take the form of an entirely hardware embodiment, an entirely software embodiment, or an embodiment containing both hardware and software elements. One embodiment may be implemented in software, which includes, but is not limited to, firmware, resident software, microcode, or other forms.

Furthermore, the different embodiments can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system, or a propagation medium. The medium also may be a physical medium or a tangible medium on which computer readable program code can be stored. Examples of a computer readable medium include a semiconductor or solid state memory, magnetic tape, a removable computer diskette, a random access memory (RAM), a read-only memory (ROM), a rigid magnetic disk, an optical disk, or some other physical storage device configured to hold computer readable program code. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example, without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers. Network adapters also may be coupled to the data processing system to enable the data processing system to become coupled to other data processing systems or remote printers or storage devices through intervening private or public networks. Modems, cable modems, and Ethernet cards are just a few of the currently available types of network adapters.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing a video data stream, the method comprising:
   receiving, by a data processing system, the video data stream from a single monoscopic video camera, wherein the video data stream is a monoscopic video data stream comprising a plurality of monoscopic images of a scene from a plurality of different directions with respect to the scene;
   selecting, by the data processing system, a plurality of image pairs from the plurality of monoscopic images, wherein a first image of a first area in the scene overlaps a second image of a second area in the scene in each image pair in the plurality of image pairs, and wherein the first image and the second image in each image pair in the plurality of image pairs are from different directions with respect to the scene; and
   adjusting, by the data processing system, the each image pair in the plurality of image pairs to form a plurality of adjusted image pairs, wherein the plurality of adjusted image pairs is configured to comprise a plurality of stereoscopic images to provide a perception of depth for the scene when the plurality of adjusted image pairs is presented as a video, and wherein each adjusted image in an adjusted image pair comprising a stereoscopic image in the plurality of stereoscopic images is from a different direction with respect to the scene.

2. The method of claim 1, wherein the step of adjusting the each image pair in the plurality of image pairs to form the plurality of adjusted image pairs comprises:
   adjusting at least one of the first image and the second image in the each image pair.

3. The method of claim 1 further comprising:
   displaying the plurality of adjusted image pairs on a display system to present the video, wherein the perception of depth for the scene is provided to a viewer of the video.

4. The method of claim 1, wherein the single monoscopic video camera is associated with a platform, and wherein the first image is taken from a first position of the platform and the second image is taken from a second position of the platform as the platform moves.

5. The method of claim 4, wherein the step of adjusting the each image pair in the plurality of image pairs to form the plurality of adjusted image pairs comprises:
   adjusting the second image relative to the first image in the each image pair in the plurality of image pairs based on a position and an orientation for the platform.

6. The method of claim 5, wherein the step of adjusting the each image pair in the plurality of image pairs to form the plurality of adjusted image pairs further comprises:

selecting a portion of each adjusted image pair in the plurality of adjusted image pairs using a number of common points in the each adjusted image pair to form the plurality of adjusted image pairs.

7. The method of claim 6, wherein the step of selecting the portion of the each adjusted image pair in the plurality of adjusted image pairs using the number of common points in the each adjusted image pair to form the plurality of adjusted images pairs is performed using epipolar warping.

8. The method of claim 1, wherein the step of selecting the plurality of image pairs from the plurality of monoscopic images comprises:

selecting the plurality of image pairs from the plurality of monoscopic images such that the first image overlaps the second image with a desired overlap in the each image pair in the plurality of image pairs, wherein the desired overlap between the first image and the second image provides an amount of image separation between the first image and the second image that is selected to take into account a separation of eyes of a viewer.

9. An apparatus comprising:

a processor unit configured to receive a monoscopic video data stream from a single monoscopic video camera, wherein the monoscopic video data stream comprises a plurality of images for a scene from a plurality of different directions with respect to the scene and wherein the processor unit processes the monoscopic video data stream to form a stereoscopic video data stream that provides a perception of depth for the scene, wherein the stereoscopic video data stream comprises a plurality of stereoscopic images and wherein each of the plurality of stereoscopic images comprises a pair of images from different directions with respect to the scene; and a display system configured to display a video using the stereoscopic video data stream of the scene generated by the processor unit.

10. The apparatus of claim 9, wherein the processor unit is configured to select a plurality of image pairs from the plurality of images, wherein a first image of a first area in the scene overlaps a second image of a second area in the scene in each image pair in the plurality of image pairs, wherein an overlap between the first image and the second image provides an amount of image separation between the first image and the second image that is selected to take into account a separation of eyes of a viewer, and adjust at least one of the first image and the second image in the each image pair in the plurality of image pairs to form a plurality of adjusted image pairs, wherein the plurality of adjusted image pairs form the stereoscopic video data stream.

11. The apparatus of claim 10, wherein the processor unit is further configured to adjust the second image relative to the first image in the each image pair in the plurality of image pairs based on a position and an orientation for a platform associated with the single monoscopic video camera.

12. The apparatus of claim 11, wherein the processor unit is further configured to select a portion of each adjusted image pair in the plurality of adjusted image pairs using a number of common points in the each adjusted image pair to form the plurality of adjusted image pairs.

13. The apparatus of claim 10, wherein the display system is configured to display the plurality of adjusted image pairs on the display system to present the video, wherein the perception of depth for the scene is provided to a viewer of the video.

14. The apparatus of claim 9, wherein the single monoscopic video camera is associated with a platform, and wherein the plurality of images for the scene are taken while the platform moves the single monoscopic video camera over the scene.

15. A computer program product comprising:

a computer readable storage device;

program instructions, stored on the computer readable storage device, for receiving a video data stream from a single monoscopic video camera, wherein the video data stream is a monoscopic video data stream comprising a plurality of monoscopic images of a scene from a plurality of different directions with respect to the scene;

program instructions, stored on the computer readable storage device, for selecting a plurality of image pairs from the plurality of monoscopic images, wherein a first image of a first area in the scene overlaps a second image of a second area in the scene in each image pair in the plurality of image pairs, and wherein the first image and the second image in each image pair in the plurality of image pairs are from different directions with respect to the scene; and program instructions, stored on the computer readable storage device, for adjusting the each image pair in the plurality of image pairs to form a plurality of adjusted image pairs, wherein the plurality of adjusted image pairs is configured to comprise a plurality of stereoscopic images to provide a perception of depth for the scene when the plurality of adjusted image pairs is presented as a video, and wherein each adjusted image in an adjusted image pair comprising a stereoscopic image in the plurality of stereoscopic images is from a different direction with respect to the scene.

16. The computer program product of claim 15 further comprising:

program instructions, stored on the computer readable storage device, for displaying the plurality of adjusted image pairs to present the video on a display system.

17. The computer program product of claim 15, wherein the program instructions, stored on the computer readable storage device, for selecting the plurality of image pairs from the plurality of monoscopic images further comprises:

program instructions, stored on the computer readable storage device, for selecting the plurality of image pairs from the plurality of monoscopic images such that the first image overlaps the second image with a desired overlap in the each image pair in the plurality of image pairs, wherein the desired overlap between the first image and the second image provides an amount of image separation between the first image and the second image that is selected to take into account a separation of eyes of a viewer.

18. The computer program product of claim 15, wherein the program instructions, stored on the computer readable storage device, for adjusting the each image pair in the plurality of image pairs to form the plurality of adjusted image pairs further comprises:

program instructions, stored on the computer readable storage device, for adjusting the second image relative to the first image in the each image pair in the plurality of image pairs based on a position and an orientation for a platform associated with the single monoscopic video camera.

19. The computer program product of claim 15, wherein the program instructions, stored on the computer readable storage device, for adjusting the each image pair in the plurality of image pairs to form the plurality of adjusted image pairs further comprises:

program instructions, stored on the computer readable storage device, for selecting a portion of each adjusted image pair in the plurality of adjusted image pairs using a number of common points in the each adjusted image pair to form the plurality of adjusted image pairs.

* * * * *